United States Patent
Matsumoto et al.

(10) Patent No.: US 8,364,496 B2
(45) Date of Patent: Jan. 29, 2013

(54) SIGNAL RECORDING AND REPRODUCING APPARATUS AND METHOD

(75) Inventors: Jun Matsumoto, Kanagawa (JP); Masayuki Nishiguchi, Kanagawa (JP); Akifumi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1102 days.

(21) Appl. No.: 12/234,768

(22) Filed: Sep. 22, 2008

(65) Prior Publication Data

US 2009/0089052 A1    Apr. 2, 2009

(30) Foreign Application Priority Data

Sep. 28, 2007   (JP) ................. P2007-255206

(51) Int. Cl.
  *G10L 21/00* (2006.01)
(52) U.S. Cl. ............... 704/500; 704/503; 381/2
(58) Field of Classification Search .......... 704/500, 704/503; 381/2
  See application file for complete search history.

(56) References Cited

U.S. PATENT DOCUMENTS

| | | | |
|---|---|---|---|
| 5,285,498 A * | 2/1994 | Johnston | 381/2 |
| 5,341,457 A * | 8/1994 | Hall et al. | 704/226 |
| 5,495,552 A | 2/1996 | Sugiyama et al. | |
| 2002/0072902 A1 | 6/2002 | Gerlach et al. | |
| 2002/0101678 A1 | 8/2002 | Van Der Vleuten | |
| 2003/0171919 A1 | 9/2003 | Kim et al. | |
| 2004/0114183 A1 | 6/2004 | Lee | |
| 2005/0183123 A1 | 8/2005 | Lee et al. | |
| 2007/0025438 A1 | 2/2007 | Bruls | |
| 2007/0043575 A1 | 2/2007 | Onuma et al. | |
| 2007/0101373 A1 | 5/2007 | Bodlanender et al. | |

FOREIGN PATENT DOCUMENTS

| | | |
|---|---|---|
| EP | 1 239 480 A2 | 9/2002 |
| EP | 1 638 344 A2 | 3/2006 |
| JP | 03-276263 | 12/1991 |
| JP | 07-253800 | 10/1995 |
| JP | 10-161925 | 6/1998 |
| JP | 2006-239148 | 9/2006 |
| JP | 2007-034230 | 2/2007 |

(Continued)

OTHER PUBLICATIONS

Geiger, R. et al., "ISO/IEC MPEG-4 High-Definition Scalable Advanced Audio Coding," Journal of the Audio Engineering Society, vol. 55, No. 1/2, Jan. 2007, pp. 27-43.

(Continued)

*Primary Examiner* — Daniel D Abebe
(74) *Attorney, Agent, or Firm* — Finnegan, Henderson, Farabow, Garrett & Dunner, L.L.P.

(57) ABSTRACT

A signal recording and reproducing apparatus includes an encoder encoding an input signal to produce a first group of encoded data, and a second group of encoded data used for reproducing a signal of higher quality than a signal resulting from decoding of the first group of encoded data, a recording unit recording record-data, including the first group and the second group of encoded data, into a recording medium, a reproducing unit reproducing the record-data from the recording medium, a decoder decoding at least the first group of encoded data out of the record-data from the reproducing unit, and a controller controlling an operation of each part of the recording and reproducing apparatus, and the controller performs control so as to cause the recording unit to erase the second group of encoded data according to a command to increase the amount of free storage capacity of the recording medium.

10 Claims, 6 Drawing Sheets

FOREIGN PATENT DOCUMENTS

WO    WO 01/69939 A1    9/2001

OTHER PUBLICATIONS

Loh, M. et al., "Press Release: Exploit Technologies Presents High-Definition Digital Audio Standards with Lossless Audio Compression Technologies," Exploit Technologies PTE Ltd., Chiba, Japan, Oct. 4, 2006, URL:http://www.a-star.edu.sg/press_release/attachment/19/MPEG_4_SLS_press_release_-_FINAL.pdf, 8 pages.

European Search Report from European Patent Office dated Feb. 9, 2009, for Application No. 08253048.6-1247 (Ref. N.105989 SLS), 7 pages.

* cited by examiner

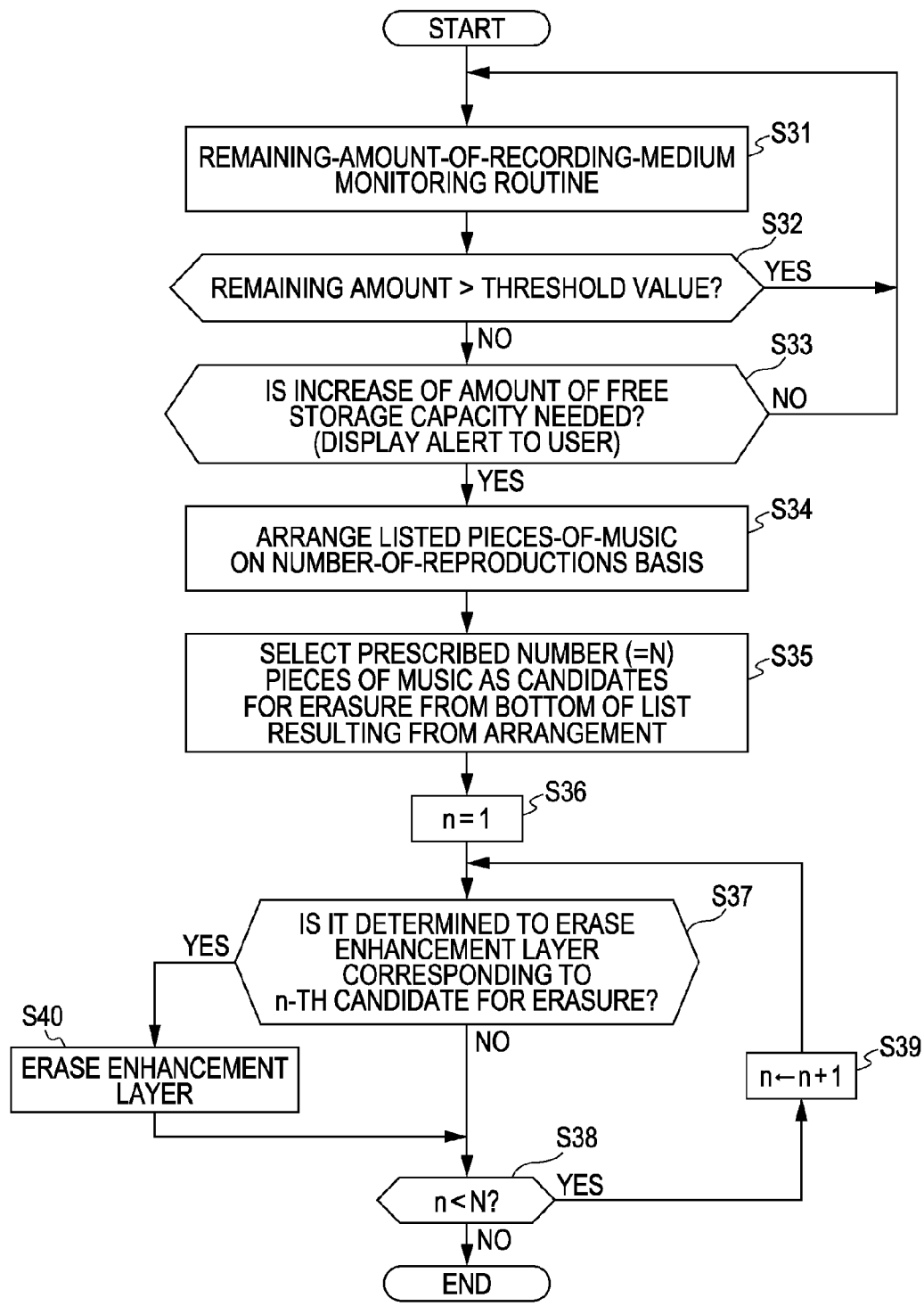

SIGNAL RECORDING AND REPRODUCING APPARATUS AND METHOD

CROSS REFERENCES TO RELATED APPLICATIONS

The present invention contains subject matter related to Japanese Patent Application JP 2007-255206 filed in the Japanese Patent Office on Sep. 28, 2007, the entire contents of which are incorporated herein by reference.

BACKGROUND OF THE INVENTION

1. Field of the Invention

The present invention relates to a signal recording and reproducing apparatus and method for encoding and recording an input signal into a recording medium, and reproducing a signal from the recording medium.

2. Description of the Related Art

There have been proposed various encoding schemes for performing compression encoding of a digital signal, resulting from analogue-to-digital conversion of an analogue signal, such as an audio signal and a video signal, by utilizing statistical characteristics of the signal. These encoding schemes include lossless (reversible) encoding, which enables complete restoration of an encoded signal to a pre-encoded signal thereof, and lossy (non-reversible) encoding, which causes errors in restoration of an encoded signal.

In the case of lossless (reversible) encoding, it is possible to retain a high quality of a signal resulting from decoding and reproducing of an encoded signal, however, in general, the amount of encoded data is large; whereas, in the case of lossy (non-reversible) encoding, it is possible to reduce the amount of encoded data to a small amount, however, the quality of the reproduced signal is inferior to that in the case of lossless (reversible) encoding.

Moreover, in the related art, a voice encoding apparatus is disclosed in, for example, U.S. Patent Application Publication No. 2003/0171919, in which a non-reversible (lossy) compression of an input voice signal is performed to produce a core (base layer) stream, and a reversible (lossless) compression of a residual-error signal is performed to produce an enhanced (enhancement layer) stream, and further, these streams are combined into one stream; and thereby, scalability between lossy compression and lossless compression can be achieved. In a voice decoding apparatus disclosed therein, a lossy decoded voice signal can be produced by decoding the core stream, and additionally, a lossless decoded signal can be produced by decoding the core stream and the enhanced stream, and by arithmetic addition of both the resultant decoded streams.

Furthermore, the production and decoding of a scalable lossless stream as well as a reduction in the processing time spent in producing and decoding the lossless stream have been realized using a voice encoding apparatus and method thereof and a voice decoding apparatus and method thereof disclosed in Japanese Unexamined Patent Application Publication No. 2007-034230.

SUMMARY OF THE INVENTION

To date, in an existing apparatus for reproducing an audio signal by performing either lossless (reversible) encoding or lossy (non-reversible) encoding, it has been observed that, in the case where the amount of recorded data stored in a recording medium inside the apparatus reaches an upper limit of storage capacity thereof, and more storage capacity is necessary for recording new data, there is no way of increasing the amount of free storage capacity other than completely erasing a portion of the encoded data, and additionally, in such a case, it becomes difficult to reproduce certain pieces of music corresponding to the encoded data targeted for the erasure after the erasure thereof has been executed.

In view of the foregoing, the present inventors have recognized that it is desirable to provide a signal recording and reproducing apparatus and method, in which, in the case where a remaining amount of storage capacity of a recording medium becomes small, it becomes possible to increase the amount of free storage capacity of the recording medium without completely erasing certain pieces of music and so forth stored therein in the form of recorded data.

According to an embodiment of the present invention, there are provided: an encoder for encoding an input signal to produce a first group of encoded data and a second group of encoded data used for reproducing a signal of higher quality than a signal resulting from decoding of the first group of encoded data; recording means for recording record-data, including the first group of encoded data and the second group of encoded data from the encoder, into a recording medium; reproducing means for reproducing the record-data from the recording medium; a decoder for decoding at least the first group of encoded data out of the record-data from the reproducing means; and controlling means for controlling an operation of each part of the signal recording and reproducing apparatus, where the controlling means performs control so as to cause the recording means to erase the second group of encoded data in accordance with a command to increase a space capacity of the recording medium.

In addition, it is noted that the first group of encoded data is non-reversible encoded data and the second group of encoded data is reversible encoded data, and it is preferable that the second group of encoded data is data resulting from performing reversible encoding of a signal obtained by subtracting a signal resulting from decoding the first group of encoded data from the input signal.

Moreover, in the case where the input signal is an audio signal, it is noted that the encoder includes: first encoding means for producing the first group encoded data resulting from performing non-reversible encoding of spectrum signals obtained by frequency-band dividing the input audio signal into a plurality of frequency bands and performing time-to-frequency conversion of the input audio signal within each frequency band, decoding means for decoding only the spectrum signals within predetermined frequency bands out of the first group of encoded data, subtracting means for subtracting the decoded signal from the input audio signal to produce a residual-error signal, and second encoding means for producing the second group of encoded data by performing reversible encoding of the residual-error signal.

Furthermore, in a signal recording and reproducing method according to an embodiment of the present invention, there are provided the steps of: encoding an input signal; recording a resultant record-data, including a first group of encoded data, and a second group of encoded data used for reproducing a signal of higher quality than a signal resulting from decoding of the first group of encoded data, into a recording medium; and reproducing at least the first group of encoded data from the recording medium, where the second group of encoded data is erased in accordance with a command to increase the amount of free storage capacity of the recording medium.

BRIEF DESCRIPTION OF THE DRAWINGS

FIG. 6 is a flowchart describing an actual example of a procedure for erasing Enhancement Layer according to an embodiment of the present invention.

DESCRIPTION OF THE PREFERRED EMBODIMENTS

An embodiment of the present invention will be hereinafter described in detail with reference to the accompanying drawings.

Figure 1:
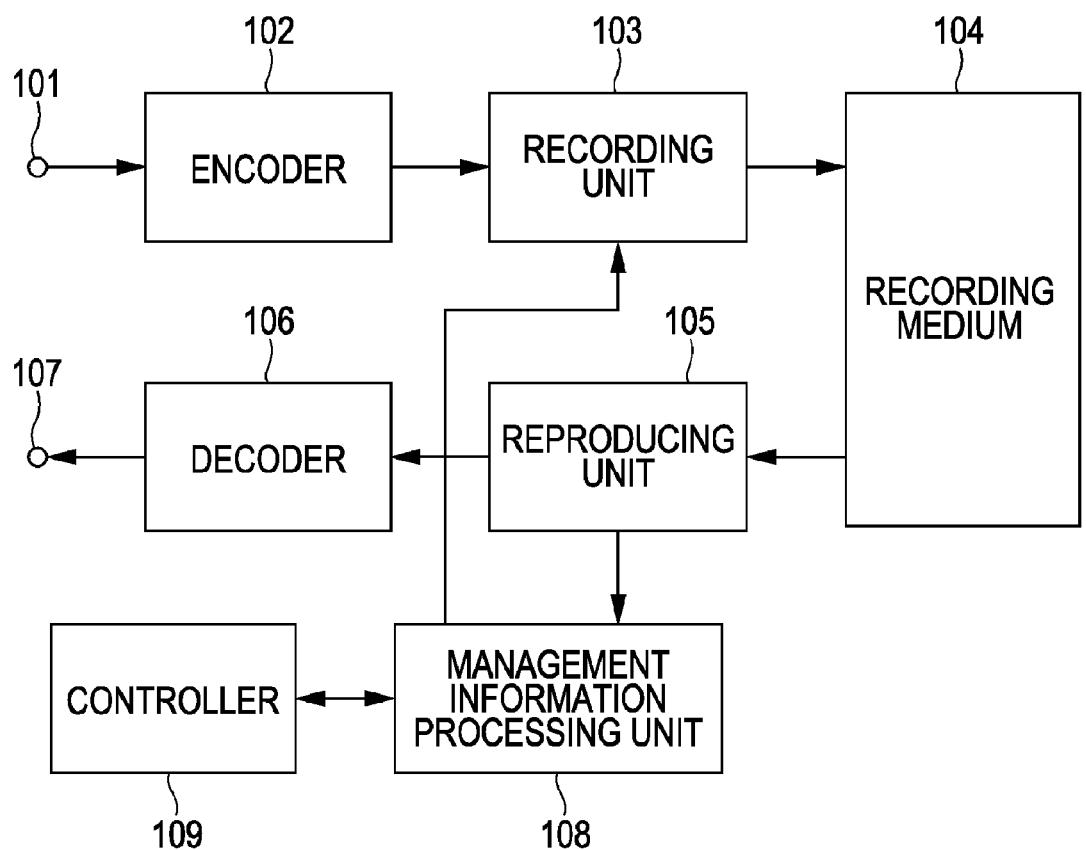
FIG. 1 is a schematic block diagram depicting a configuration of a signal recording and reproducing apparatus, according to an embodiment of the present invention.

FIG. 1 is a schematic block diagram depicting a signal recording and reproducing apparatus according to an embodiment of the present invention.

In FIG. 1, a signal, such as a digital audio-signal, resulting from analogue-to-digital conversion of an analogue signal, is inputted to an input terminal 101, is encoded in an encoder 102, and then, the resultant encoded data is recorded into a recording medium (or a storage medium) 104 by a recording unit 103. The recorded data in the recording medium 104 is reproduced in a reproducing unit 105, is decoded in a decoder 106, and then, the original signal, such as the digital audio signal, is outputted from an output terminal 107. A management information processing unit 18 is a unit for managing information used for recording and reproducing data into/from the recording medium 104, such as positions of recording and reproducing, an amount of recorded data, and a remaining amount of storage capacity of the recording medium. Moreover, the management information processing unit 18 causes the recording unit 103 to add header-information and meta-information to the encoded audio data, or the like, when recording thereof, and further, causes the reproducing unit 105 to perform separating and abstracting of the header-information and the meta-information from the encoded audio signal, or the like, when reproducing thereof. A controller 109, which is a so-called system controller using a CPU, controls each part of the signal recording and reproducing apparatus, and further, transmits and receives recording-management information to/from the management information processing unit 108, and performs control of recording and reproducing data to/from the recording medium 104. In addition, it is obvious that a semiconductor memory (a so-called flash memory and so forth), as well as a disk, a tape, or the like, can be used as the recording medium (or a storage medium) 104.

Figure 2A:
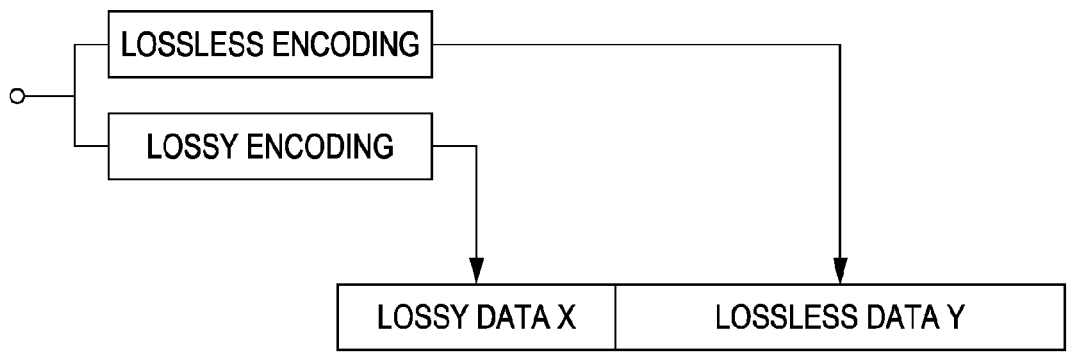
FIG. 2 is a block diagram depicting an example of an encoding scheme embodied in an encoder 102 according to an embodiment of the present invention shown in FIG. 1.
Figure 2B:
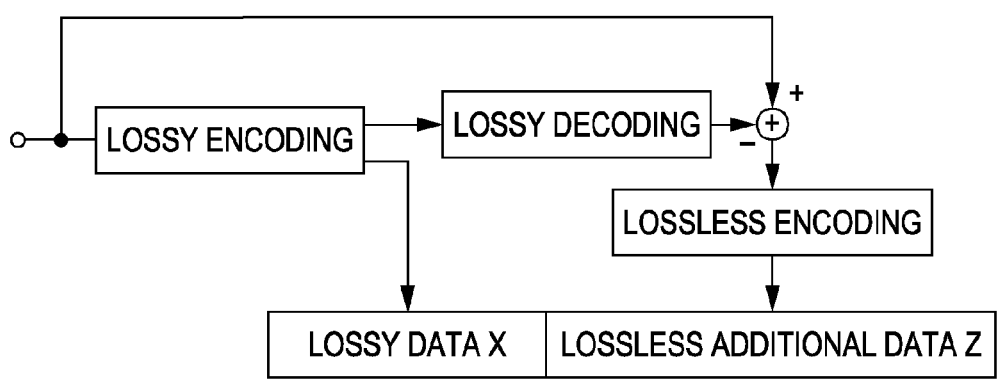

Additionally, there are various embodiments associated with an encoding scheme embodied in the encoder 102, shown in FIG. 1, and one of the embodiments having the functionality of encoding of information included an input signal without any losses (i.e., lossless encoding) is represented by way of an example shown in FIG. 2. In FIG. 2A, there are shown two sections which are simply collocated and are able to be independently decoded, one being a lossy encoded section (lossy data X), defined as a first group of encoded data, resulting from performing non-reversible encoding of an input signal, the other one being a lossless encoded section (lossless data Y), defined as a second group of encoded data, resulting from performing reversible encoding of the same input signal. In FIG. 2B, there are shown two sections, one of which is a lossy encoded section (lossy data X), defined as a first group of encoded data, the other one of which is a lossless encoded section (lossless additional data Z), defined as a second group of encoded data, and moreover, there is shown a configuration in which these two sections form a layered structure, and by using the lossless encoded section (lossless additional data Z) as a supplement of lost signal-elements resulting from lossy encoding, a lossless representation of an original signal can be achieved.

Wherein, in accordance with a command to increase the amount of free storage capacity of the recording medium 104, the controller 109, shown in FIG. 1, enables reproducing of the lossy encoded section (lossy data X) retained in the recording medium 104 without being erased, as well as increasing the amount of free storage capacity of the recording medium 104, by erasing the lossless encoded section (i.e., the lossless data Y or the lossless additional data Z), defined as the second group of recoded data, recorded in the recording medium 104.

Hereinafter, an embodiment of the present invention will be described mainly by way of an example in which an audio signal is inputted as the input signal in the case of encoding scheme shown in FIG. 2B. However, it is noted that the present invention can be applied to the case shown in FIG. 2A and/or a case where the input signal is any signal other than the audio signal, such as a video signal.

Figure 3:
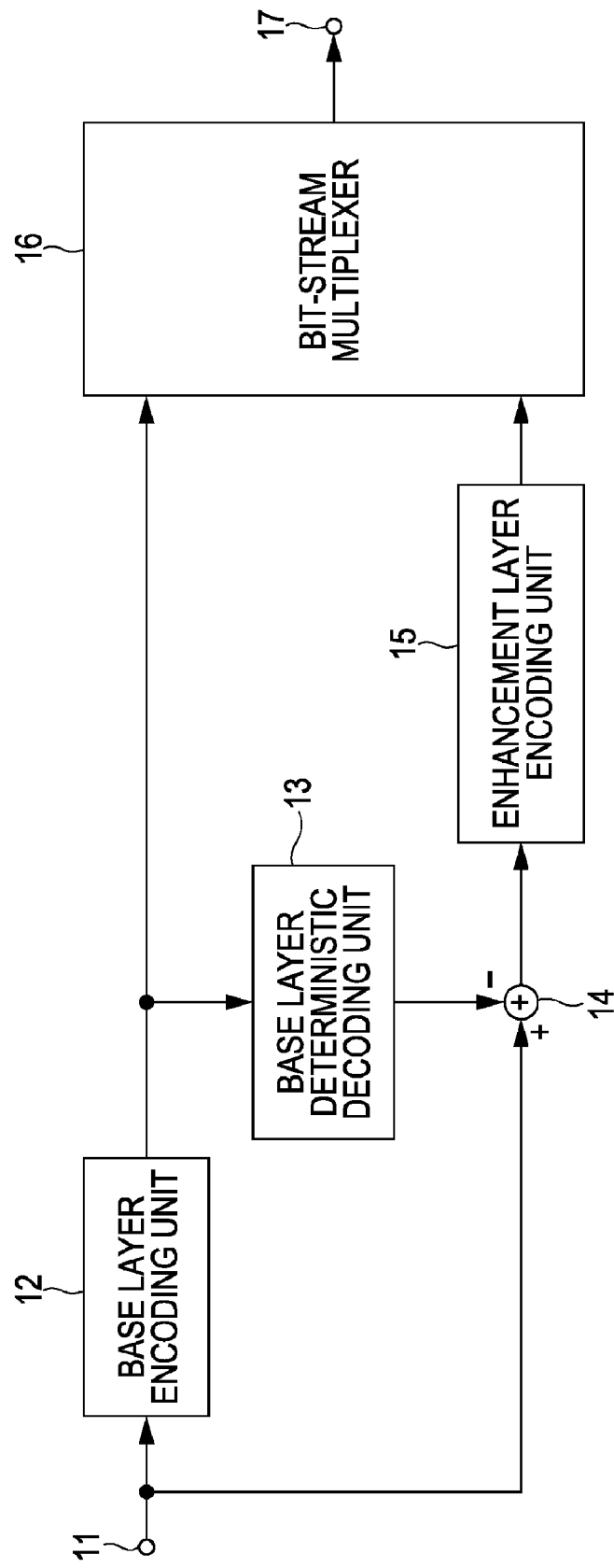
FIG. 3 is a schematic block diagram depicting a configuration of an audio signal encoding apparatus, as an actual example of an encoder 102 according to an embodiment of the present invention shown in FIG. 1.

FIG. 3 is a schematic block diagram illustrating an actual example of an encoding apparatus, as an example of the encoder 102 shown in FIG. 1, in which the above-described lossy encoded section and the lossless encoded section form a layered structure, as shown in FIG. 2B, and also, illustrates, for example, a schematic block diagram of an audio signal encoding apparatus according to ATRAC Advanced Lossless™, which is a reversible-codec technology and a standard of Adaptive Transform Acoustic Coding (ATRAC™). The encoding scheme according to ATRAC Advanced Lossless™, which is different from usual reversible encoding schemes, realizes a reversible encoding scheme as a whole, by performing, as a first step, non-reversible encoding with high efficiency, and performing, as a second step, reversible encoding of a quantization-error signal resulting from performing the first step, and therefore, is a so-called lossless encoding with scalability. In the following description, the non-reversible (lossy) encoded section and the reversible (lossless) encoded section are represented as Base Layer and Enhancement Layer, respectively.

The audio signal encoding apparatus (i.e., an audio encoder), shown in FIG. 3, includes an input terminal corresponding to the input terminal 101 shown in FIG. 1, a Base Layer encoding unit 12, a Base Layer Deterministic decoding unit 13, a subtracter 14, an Enhancement Layer encoding unit 15 and a bit-stream multiplexer 16, and moreover, an encoded bit-stream from the bit-stream multiplexer 16 is outputted through an output terminal 17 and transmitted to the recording unit 103 shown in FIG. 1.

In this audio-signal encoding apparatus, shown in FIG. 3, an input signal from the input terminal 11 is fed to the Base Layer encoding unit 12, and the Base Layer encoding unit 12 performs dividing of the input audio signal into a plurality of frequency bands, performs time-to-frequency conversion of the input audio signal within each of the frequency bands to obtain spectrum signals thereof, and subsequently, performs non-reversible encoding of the spectrum signals to produce non-reversible (lossy) encoded data (Base Layer), defined as a first group of encoded data. The non-reversible encoded data from the Base Layer encoding unit 12 is transmitted to the Base Layer Deterministic decoding unit 13 and the bit-stream multiplexer 16. The Base Layer Deterministic decoding unit 13 decodes only the spectrum signals within predetermined frequency bands out of the non-reversible encoded data from the Base Layer encoding unit 12 to produce a decoded signal. The decoded signal from the Base Layer Deterministic decoding unit 13 is transmitted to the subtracter 14, and then, is subtracted from the input audio signal from the input terminal 11, to produce a residual-error signal. The residual-error signal from the subtracter 14 is transmitted to the Enhancement Layer encoding unit 15. The Enhancement Layer encoding unit 15 performs reversible encoding of the residual-error signal from the subtracter 14 to produce reversible (lossless) encoded data (Enhancement Layer), defined as a second group of encoded data, and transmits the resultant reversible (lossless) encoded data to the bit-stream multiplexer 16. The bit-stream multiplexer 16 combines the non-reversible encoded data from the Base Layer encoding unit 12 and the reversible encoded data from the Enhancement Layer encoding unit 15 to produce an encoded bit-stream, and then, transmits the resultant encoded bit-stream to the output terminal 17.

Figure 4:
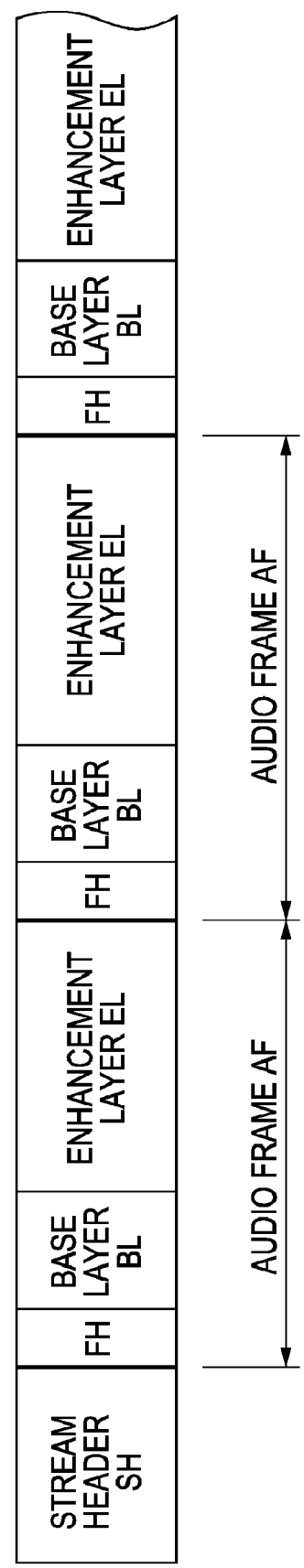
FIG. 4 is a diagram depicting a format of a stream data recorded in a recording medium.

In the recording unit 103, shown in FIG. 1, a header and so forth are added to the encoded bit-stream outputted from the output terminal 17, and the resultant encoded bit-stream is recorded into the recording medium 104 in accordance with a file format, such as that of ATRAC Advanced Lossless™ shown in FIG. 4.

In this FIG. 4, audio data constituted of a plurality of audio frames AFs is located following a stream header SH which functions as a header of the whole bit-stream, and further, each of the audio frames AFs includes a frame header and both encoded data of the Base Layer BL and the Enhancement Layer EL. That is to say, owing to such a scalable structure, the input signal is represented as two data layers, one of which is the Base Layer BL having a compact data size, the other one of which is the Enhancement Layer EL enabling the decoded output signal to be completely conformed to the input signal. These two data layers can be managed in an integrated way by using one file, and it is possible to determine whether either of the data layers is appropriate for reproduction in accordance with the condition or purpose of utilization. For example, in home-devices, in which an information source (e.g., music) is retained in a hard disk in a file format including two kinds of formats for both the Base Layer BL and the Enhancement Layer EL, and by decoding all of the Base Layer BL and the Enhancement Layer EL, it is possible to reproduce a high quality signal, which completely conforms to the original sound source. Moreover, in the case of portable devices having a small amount of recording capacity (or storage capacity), by transferring only the Base Layer BL, it becomes possible to reproduce as many pieces of music as possible under a condition of limited recording capacity, as well as to suppress the degradation of sound quality.

Figure 5:
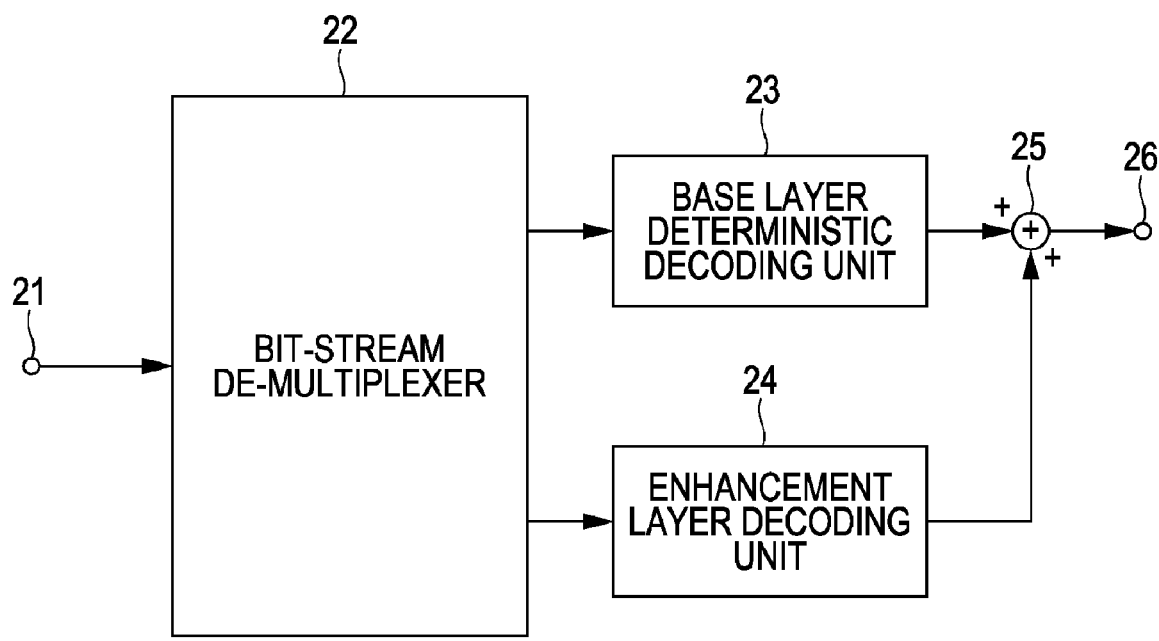
FIG. 5 is a schematic block diagram depicting a configuration of an audio signal decoding apparatus, as an actual example of a decoder 106 according to an embodiment of the present invention shown in FIG. 1.

FIG. 5 is a schematic diagram illustrating an audio signal decoding apparatus, as an actual example of the decoder 106 shown in FIG. 1, which is configured to perform decoding, which is a reverse process of the above-described encoding, shown in FIG. 2B, performed by the audio signal encoding apparatus.

The audio signal decoding apparatus, shown in FIG. 5, includes a bit-stream de-multiplexer 22, into which the reproduced signal from the reproducing unit 105, shown in FIG. 1, is fed through an input terminal 21; a Base Layer Deterministic decoding unit 23 for decoding the encoded data of the Base Layer separated in the bit-stream de-multiplexer 22; an Enhancement Layer decoding unit 24 for decoding the encoded data of the Enhancement Layer separated in the bit-stream de-multiplexer 22; and an adder 25 for arithmetic addition of both output signals from the Base Layer Deterministic decoding unit 23 and the Enhancement Layer decoding unit 24, and further, the decoded audio signal from the adder 25 is outputted through an output terminal 26 (i.e., the output terminal 107 in FIG. 1). In this case, as described above, by decoding all of the encoded data included in both the Base Layer and the Enhancement Layer, it is possible to perform reproduction of a high quality signal, which completely conforms to the original sound source.

Hereinafter, the Base Layer Deterministic decoding units 13 and 23, which are used in both of the decoders and play an important role, will be described. In such a case where lossless encoding is realized by breaking it down to multi-layers as described above, in order to obtain decoded outputs which completely conform to each other on any platform, it is necessary that respective layers in the decoders can perform deterministic operations regardless of differences in control systems. As a solution to fulfill the necessity, it is made a condition that respective layers in the decoders can perform operations on the basis of integer arithmetic in which arithmetic accuracy is completely specified. This condition can be relatively easily achieved with respect to the Enhancement Layer, however, with respect to the Base Layer having lots of elements, such as an orthogonal transformation, realized basically on the basis of floating point arithmetic, it is more likely to become difficult to implement the Base Layer due to reasons, such as an increase in the amount of arithmetic, unless other conditions are added to this condition.

In the case of ATRAC Advanced Lossless™, in association with the Base Layer, which is the non-reversible (lossy) encoded section, an encoding scheme according to ATRAC™ is used. This encoding scheme is configured to perform orthogonal transformation after dividing an input signal into a plurality of frequency bands, and thus, it becomes possible to control so that the number of frequency bands to be decoded is determined from a balance between the amount of arithmetic and a compression ratio, and further, the decoding associated with frequency bands beyond a determined number of frequency bands is not performed, and a subsequent process is entrusted to the processing associated with the Enhancement Layer. That is to say, in the Base Layer Deterministic decoding units 13 and 23, shown in FIG. 3 and FIG. 5, respectively, only the spectrum signals within predetermined frequency bands out of encoded data of the Base Layer inputted are decoded. Owing to this method, with respect to the decoder, it becomes possible to maintain the determinacy of operations and complete conformance to the original sound source, as well as to achieve both compatibility with ATRAC™ and a reduction in the amount of arithmetic.

Moreover, since a signal resulting from performing lossless decoding is completely conformed to the original input signal, it is possible to maintain a high quality of sound, however, the data size thereof, more specifically, the sum of the data size of the Base Layer and that of the Enhancement Layer is approximately 50% to 60% of that of the original signal, and thus, the maximum allowable length of a signal (or the number of pieces of music) to be stored in the recording medium (or the storage medium) having a limited storage capacity is significantly restricted. On the other hand, by using an audio encoding scheme with high efficiency in performing encoding associated with the lossy encoded section, it becomes possible to suppress the data size thereof to approximately 1/10 to 1/3 of that of the Enhancement Layer, as well as to suppress the degradation of sound quality to a minimum level.

Accordingly, in the case where, in the recording and reproducing apparatus, a space capacity of the recording medium (or the storage medium) becomes small, it becomes possible to restore the space capacity of the recording medium to a large extent without erasing all pieces of music, by performing an operation so as to erase certain portions of the Enhancement Layer corresponding to specified pieces of music and to leave certain portions of the Base Layer only corresponding to the specified pieces of music. As described below, the controller 109, shown in FIG. 1, determines that the space capacity of the recording medium becomes small by monitoring the management information, such as the space capacity of the recording medium from the management information processing unit 108, and then, issues a command so as to increase the space capacity, automatically or upon receipt of a confirmation by the user. Subsequently, the controller 109 performs record-controlling so as to cause the recording unit 103 to erase the certain portions of the Enhancement Layer, which is a second group of encoded data, as described above.

An increase in the amount of free storage capacity of the recording medium will be hereinafter described. In an audio signal constituted of N frames, where N is a total number of recorded frames in the recording medium, assuming that the data sizes of the Base Layer (lossy) and of the Enhancement Layer (lossless) in i-th frame are $S_{lossy}(i)$ and $S_{lossless}(i)$, respectively, the total data size before erasing the Enhancement Layer is represented by the following formula (1).

$$\sum_{i=0}^{N-1} S_{lossy}(i) + \sum_{i=0}^{N-1} S_{lossless}(i) \quad (1)$$

Assuming that M frames of the Enhancement Layer are erased from among N recorded frames in the recording medium, the data size left after the erasure is represented by the following formula (2).

$$\sum_{i=0}^{N-1} S_{lossy}(i) + \sum_{i=M}^{N-1} S_{lossless}(i) \quad (2)$$

In addition, in the formula (2), it is assumed that the actual frame numbers of the M frames are rearranged, and M frames of M(i) ($0 \leq i \leq M-1$) are targets for the erasure.

Hereat, in the case where N and M are sufficiently large, assuming that average values of $S_{lossy}(i)$ and $S_{lossless}(i)$ are represented by
$\overline{S_{lossy}}$ and $\overline{S_{lossless}}$, respectively,
respective terms of the formulae (1) and (2) can be approximated as follows:

$$\sum_{i=0}^{N-1} S_{lossy}(i) \cong N\overline{S_{lossy}}, \quad \sum_{i=0}^{M-1} S_{lossy}(i) \cong M\overline{S_{lossy}}$$

$$\sum_{i=0}^{N-1} S_{lossless}(i) \cong N\overline{S_{lossless}}, \quad \sum_{i=0}^{M-1} S_{lossless}(i) \cong M\overline{S_{lossless}}$$

Therefore, a ratio of the formula (2) to the formula (1) can be represented by the following formula (3).

$$\frac{M}{N} \frac{\overline{S_{lossy}}}{\overline{S_{lossy}} + \overline{S_{lossless}}} + \frac{N-M}{N} \quad (3)$$

Hereat, let us assume that r is a resultant value of the following formula:

$$\frac{\overline{S_{lossy}}}{\overline{S_{lossy}} + \overline{S_{lossless}}}$$

By using r, the formula (3) can be represented as 1−(1−r)M/M, and further, since r is usually a small value (i.e., equal to approximately 1/10), this formula can be approximated to 1−M/N. Accordingly, it follows that it is possible to restore the storage capacity of the recording medium (or the storage medium) substantially in proportion to the number of frames having the Enhancement Layer erased.

As an actual example thereof, according to the operation rule of the above-described ATRAC™, the encoding bit-rate can be selected from among ten kinds of bit-rates; 32, 48, 64, 96, 128, 160, 192, 256, 320 and 352 kbps. Moreover, the bit-rate of the Enhancement Layer varies substantially from 600 kbps to 1500 kbps for each frame to be processed, according to the characteristics of the input signal. In general, by using 128 kbps or a similar bit-rate as the encoding bit-rate, it is possible to obtain a sound quality equivalent to that of MD™, and therefore, by promptly transferring only the Base Layer (i.e., by decoding only the Base Layer), it is possible to obtain a sound of sufficient quality for portable audio devices, and further, in systems incorporating a high-performance CPU therein, such as PCs and in-vehicle devices, in the case of an original file, (by fully decoding the Base Layer and the Enhancement Layer), it is possible to reproduce a high quality sound that completely conforms to the original sound. In the embodiment of the present invention, this becomes possible in the case of performing full decoding on such a system operating on a high-performance CPU basis, in conjunction with the decoding of only the Base Layer.

In the past, in the case where the remaining amount of free storage capacity in a recording medium (or a storage medium) in a system becomes small, there has been no method of increasing the amount of free storage capacity other than a method of completely erasing certain pieces of music selected, and thus, it has been difficult to reproduce certain pieces of music which have been erased once. On the other hand, by using a method according to the embodiment of the present invention in which only the Enhancement Layer is erased, even after the erasure of certain pieces of music, it is possible to continue reproducing the pieces of music that were targeted for the erasure with minimum degradation of sound quality, as well as to retain a benefit of increasing the amount of free storage capacity by an amount substantially equivalent to that of a complete erasure.

As described above, it is possible to increase the amount of free recording capacity (or storage capacity) by erasing the Enhancement Layer, and hereinafter, there will be described a technology which allows users to be informed when and how to perform the erasure, and in addition, a technology in which the erasure is automatically performed by the recording and reproducing apparatus.

For example, a user may monitor the amount of free storage capacity on the recording medium, and upon recognizing that it becomes small, the user selects certain pieces of music whose corresponding portions of the Enhancement Layer are going to be erased, and then, performs erasure of the selected pieces of music. In addition, for example, for a user, a function of increasing the amount of free storage capacity in the recording medium performed by the recording and reproducing apparatus is provided, and on receipt of a command issued by the user to cause the function to operate, certain software, installed in the recording and reproducing apparatus, automatically performs erasure of certain portions of the Enhancement Layer.

There are various methods of selecting pieces of music to be targeted for erasure, one of which is a simple method in which the pieces of music are erased in an order in accordance with a directory structure thereof. Some methods are described hereafter as practical examples. In a first method, the pieces of music are arranged in accordance with the numbers of reproductions thereof performed in the recording and reproducing apparatus, and then, candidates for the erasure are sequentially selected in accordance with an order of priority, wherein the piece of music having the smallest number of reproductions is erased first. In a second method, the pieces of music are arranged in accordance with the sizes of data thereof stored in the recording medium, and then, the candidates are sequentially selected in accordance with an order of priority, wherein the piece of music having the largest size of data is erased first. In a third method, the pieces of music are arranged in accordance with latest access date-and-time thereof (i.e., the date-and-time when the recording or the reproducing of a piece of music was last performed), and then, the candidates are sequentially selected in accordance with an order of priority, wherein the piece of music having the oldest access date-and-time is erased first. Further, it is possible to combine these methods. By erasing the portions of the Enhancement Layer corresponding to the pieces of music selected as the candidates, it becomes possible to increase the amount of free storage capacity. It is also possible that, prior to the erasure, an alert, which notifies the user the portions of the Enhancement Layer corresponding to pieces of music selected as candidates for the erasure are going to be erased, is output, and then, upon receipt of permission by the user, the erasure is performed.

Furthermore, so that the erasure can be automatically performed, certain pieces of software installed in the recording and reproducing apparatus can be configured to invoke a software task for periodically executing the erasure of certain portions of the Enhancement Layer. By selecting pieces of music as candidates for the erasure, as in the above-described example, in accordance with an order of priority, wherein a piece of music having the smallest number of reproductions, the largest data size, or the oldest access date-and-time in a recent access history is erased first, and further, by erasing portions of the Enhancement Layer corresponding to the candidates, an increase in the amount of free storage capacity with efficiency can be achieved. In addition, as described above, prior to the erasure, it is possible to output an alert for notifying the user that certain portions of the Enhancement Layer corresponding to the pieces of music selected as candidates for the erasure are going to be erased.

Hereinafter, an actual example will be described with reference to FIG. 6, in which the selection of pieces of music as candidates for the erasure is performed in accordance with an order of priority, wherein a piece of music having the smallest number of reproductions is erased first. A series of processes, shown in this FIG. 6, is performed, for example, by causing a CPU to execute system software, in the controller 109, shown in FIG. 1.

In FIG. 6, in step S31, a remaining-amount-of-recording-medium monitoring routine monitors the remaining amount of free storage capacity, i.e., the amount of free storage capacity of a recording medium, and in step S32, it is determined whether the remaining amount is more than a predetermined threshold value, or not. When the determination is "Yes" (i.e., in the case where the remaining amount is more than the predetermined value), the flow returns to step S31 and the monitoring is continued by the remaining-amount-of-recording-medium monitoring routine. When the determination, in step S32, is "No" (i.e., in the case where the remaining amount is less than or equal to the predetermined value), the flow proceeds to step S33. In step S33, it is determined whether the remaining amount of free storage capacity is to be increased, or not. Actually, this can be realized by displaying an alert to a user and waiting for a confirmation by the user. When the determination, in step S32, is "No" (i.e., in the case where it is decided not to increase the amount of free storage capacity), the flow returns to step S31.

In step S32, when the determination is "Yes" (i.e., in the case where it is determined to increase the amount of free storage capacity), the flow proceeds to step S34, where listed pieces of music are arranged on the basis of the numbers of reproductions thereof. This is a process in which the numbers of reproductions associated with the pieces of music recorded in the recording medium are read out to produce a list including the pieces of music arranged in an ascending order from the piece of music having the smallest number of reproductions to that having the largest number of reproductions. In step S35, certain pieces of music, such as predetermined N (a fixed value) pieces of music, are selected from among pieces of music having a small number of reproductions in the list produced on the basis of the above-described arrangement.

After a variable value n for counting the number of erased pieces of music is initialized (i.e., n=1), in step S36, the flow proceeds to step S37, where it is determined whether certain portions of the Enhancement Layer corresponding to the n-th candidate (i.e., n-th piece of music) for the erasure are going to be erased, or not. Actually, in the process in step S37, a name (i.e., a title) or the like of the n-th piece of music selected as a candidate for the erasure is displayed to a user so as to prompt the user to decide whether the erasure is to be performed, or not. By using this method, it is possible to efficiently perform the erasure of certain portions of the Enhancement Layer, as well as to suppress, to a minimum level, any discomfort felt by the user regarding the degradation of reproduction quality after the erasure has been performed.

When the determination, in step S37, is "No" (i.e., in the case where it is determined not to perform erasure of certain portions of the Enhancement Layer), the flow proceeds to step S38, where it is determined whether the variable number n is smaller than a predetermined value N, or not, and when determined that n is smaller than N, the flow proceeds to step S39, where the variable number n is incremented (i.e., n=n+1), and then, the flow returns to step S37.

When the determination, in step S37, is "Yes" (i.e., in the case where it is determined to execute erasure of certain portions of the Enhancement Layer), the flow proceeds to step S40, where the process of erasing the certain portions of the Enhancement Layer corresponding to the n-th candidate (i.e., n-th piece of music) for the erasure is performed, and subsequently, the flow proceeds to the above-described step S38.

Hereinafter, a method for erasing the Enhancement Layer in the case of ATRAC Advanced Lossless™ will be described. A data size of the Base Layer (a fixed value for every frame) is obtained from the prescribed information (i.e., ATRAC configuration) recorded in the stream header, disposed in the file format shown in FIG. 4. Subsequently, the data size of the Base Layer, which was obtained in the foregoing process, is subtracted from a frame-data size (which varies for each frame) obtained from the frame-header disposed at the head of each frame, and thereby, the data size of the Enhancement Layer can be calculated and the calculated data size of the Enhancement Layer is deleted. By applying this process repeatedly for every frame to erase the Enhancement Layer, it becomes possible to produce a music stream constituted of the Base Layer that complies with ATRAC™. In addition, this erasure process is performed in such a way that, for example, the controller 109, shown FIG. 1, causes the recording unit 103 to erase the data recorded in the recording medium 104 on the basis of management-information from the management information processing unit 108. In practical cases, the erasure process is commonly performed by rewriting the management-information, such as information in Table Of Contents (TOC) and File Allocation Table (FAT) of the recording medium 104, and header information included in the data stream.

According to the above-described embodiment of the present invention, in the recording and reproducing apparatus including a method of lossless encoding, it becomes possible to increase the amount of free storage capacity of a recording medium to a large extent, as well as to retain a condition under which reproduction of pieces of music can be performed without complete erasure thereof.

Additionally, it should be understood by those skilled in the art that various modifications, combinations, sub-combinations and alterations may occur depending on design requirements and other factors insofar as they are within the scope of the appended claims or the equivalents thereof.

What is claimed is:

1. A signal recording and reproducing apparatus, comprising:
   an encoder for encoding an input signal to produce a first group of encoded data, and a second group of encoded data used for reproducing a signal of higher quality than a signal resulting from decoding of the first group of encoded data, wherein the first group of encoded data is non-reversible encoded data, and the second group of encoded data is reversible encoded data;
   recording means for recording record-data, including the first group of encoded data and the second group of encoded data from the encoder, into a recording medium;
   reproducing means for reproducing the record-data from the recording medium;
   a decoder for decoding at least the first group of encoded data out of the record-data from the reproducing means; and
   controlling means for controlling an operation of each part of the signal recording and reproducing apparatus;
   wherein the controlling means performs control so as to cause the recording means to erase the second group of encoded data in accordance with a command to increase the amount of free storage capacity of the recording medium.

2. The signal recording and reproducing apparatus according to claim 1,
   wherein the second group of encoded data is data resulting from performing reversible encoding of a signal obtained by subtracting a signal resulting from decoding of the first group of encoded data from the input signal.

3. The signal recording and reproducing apparatus according to claim 1,
   wherein the input signal is an audio signal, and wherein the encoder includes first encoding means for producing the first group of encoded data resulting from non-reversible encoding of at least one spectrum signal obtained by frequency-band dividing the input audio signal into a plurality of frequency bands and performing time-to-frequency conversion of the input audio signal within each of the frequency bands,
   decoding means for decoding only the at least one spectrum signal within at least one predetermined frequency band out of the first group of encoded data,
   subtracting means for subtracting the decoded signal from the input audio signal to produce a residual-error signal, and
   second encoding means for producing the second group of encoded data by performing reversible encoding of the residual-error signal.

4. The signal recording and reproducing apparatus according to claim 3,
   wherein a file having record-data including the first group of encoded data and the second group of encoded data is formed individually for each piece of music included in the audio signal, and
   wherein, in the case where a plurality of the files are recorded in the recording medium, the controlling means performs control so as to erase the second group of encoded data included in at least one candidate file selected from among the plurality of the files in advance.

5. The signal recording and reproducing apparatus according to claim 4,
   wherein the at least one candidate file is selected in accordance with a past number of reproductions of each of the files, and in an order in accordance with a priority given to at least one file having a smallest number of reproductions.

6. The signal recording and reproducing apparatus according to claim 4,
   wherein the at least one candidate file is selected in an order in accordance with a priority given to at least one file having a largest file size stored in the recording medium.

7. The signal recording and reproducing apparatus according to claim 4,
   wherein the at least one candidate file is selected in an order in accordance with a priority given to at least one file having an oldest access date-and-time from among recently accessed files.

8. A signal recording and reproducing method, comprising the steps of:
   encoding an input signal;
   recording a resultant record-data, including a first group of encoded data, and a second group of encoded data used for reproducing a signal of higher quality than a signal resulting from decoding of the first group of encoded data, into a recording medium, wherein the first group of encoded data is non-reversible encoded data, and the second group of encoded data is reversible encoded data; and
   reproducing at least the first group of encoded data from the recording medium;
   wherein the second group of encoded data is erased in accordance with a command to increase the amount of free storage capacity of the recording medium.

9. A signal recording and reproducing method according to claim 8, wherein the second group of encoded data is data resulting from performing reversible encoding of a signal obtained by subtracting a signal resulting from decoding of the first group of encoded data from the input signal.

10. A signal recording and reproducing apparatus, comprising:

an encoder configured to encode an input signal to produce a first group of encoded data, and a second group of encoded data used for reproducing a signal of higher quality than a signal resulting from decoding of the first group of encoded data, wherein the first group of encoded data is non-reversible encoded data, and the second group of encoded data is reversible encoded data;

a recording unit configured to record record-data, including the first group of encoded data and the second group of encoded data from the encoder, into a recording medium;

a reproducing unit configured to reproduce the record-data from the recording medium;

a decoder configured to decode at least the first group of encoded data out of the record-data from the reproducing means; and a controller configured to control an operation of each part of the signal recording and reproducing apparatus;

wherein the controller performs control so as to cause the recording unit to erase the second group of encoded data in accordance with a command to increase the amount of free storage capacity of the recording medium.

\* \* \* \* \*